United States Patent
Joshi et al.

(10) Patent No.: US 12,119,769 B2
(45) Date of Patent: Oct. 15, 2024

(54) METHOD FOR CONTROLLING A ROTARY ELECTRIC MACHINE AND A SYSTEM THEREOF

(71) Applicant: SEDEMAC MECHATRONICS PVT LTD, Mumbai (IN)

(72) Inventors: Anaykumar Joshi, Nagpur (IN); Amit Dixit, Pune (IN)

(73) Assignee: SEDEMAC MECHATRONICS PVT LTD, Mumbai (IN)

( * ) Notice: Subject to any disclaimer, the term of this patent is extended or adjusted under 35 U.S.C. 154(b) by 218 days.

(21) Appl. No.: 18/014,539

(22) PCT Filed: May 21, 2021

(86) PCT No.: PCT/IN2021/050494
§ 371 (c)(1),
(2) Date: Jan. 5, 2023

(87) PCT Pub. No.: WO2021/234738
PCT Pub. Date: Nov. 25, 2021

(65) Prior Publication Data
US 2023/0268864 A1    Aug. 24, 2023

(30) Foreign Application Priority Data
May 21, 2020    (IN) .............. 202021021442

(51) Int. Cl.
H02P 27/08    (2006.01)
H02P 6/00    (2016.01)

(52) U.S. Cl.
CPC ............ *H02P 27/085* (2013.01); *H02P 6/007* (2013.01)

(58) Field of Classification Search
CPC .......... H02P 27/085; H02P 6/16; H02P 6/007
See application file for complete search history.

(56) References Cited

U.S. PATENT DOCUMENTS

| | | | | |
|---|---|---|---|---|
| 6,498,451 B1 * | 12/2002 | Boules | ................... | H02K 29/08 |
| | | | | 318/400.06 |
| 7,932,691 B2 * | 4/2011 | Son | ........................ | H02P 23/04 |
| | | | | 318/400.03 |

(Continued)

FOREIGN PATENT DOCUMENTS

WO    2018130793 A1    7/2018

OTHER PUBLICATIONS

ISA/US "International Search Report for PCT/IN2021/050494", US, Jul. 5, 2022.

*Primary Examiner* — Rina I Duda
(74) *Attorney, Agent, or Firm* — Locke Lord LLP; Tim Tingkang Xia, Esq.

(57) ABSTRACT

The present invention relates to a method (200) and system (100) for controlling a rotary electric machine wherein a state of the rotary electric machine is determined between a low speed state and a high speed state. In the low speed state, a first rotor position (P1) and a first rotor speed (S1) are estimated based on intra-PWM current ripple ($\Delta X$), a mean current vector (Y) and an inductance vector. A second rotor position (P2) and second rotor speed (S2) is estimated based on average current flowing through stator phase windings. State of rotary electric machine is selected based on estimated first rotor speed (S1) and/or estimated second rotor speed (S2). At low speed state, PWM signals are updated based on estimated first rotor position (P1), and at high speed state, PWM signals are updated based on estimated second rotor position (P2).

19 Claims, 8 Drawing Sheets

(56) References Cited

U.S. PATENT DOCUMENTS

| | | | |
|---|---|---|---|
| 8,400,088 B2 * | 3/2013 | De Belie | H02P 21/04 |
| | | | 318/432 |
| 8,829,846 B2 * | 9/2014 | Qin | H02P 21/18 |
| | | | 318/811 |
| 9,007,004 B2 * | 4/2015 | Hunter | H02P 21/18 |
| | | | 318/609 |
| 2011/0304290 A1 * | 12/2011 | Ito | H02P 21/18 |
| | | | 318/400.32 |
| 2013/0057193 A1 | 3/2013 | Iwaji et al. | |
| 2015/0084576 A1 * | 3/2015 | Magee | H02P 6/183 |
| | | | 318/768 |
| 2017/0129340 A1 | 5/2017 | Murthy et al. | |

* cited by examiner

METHOD FOR CONTROLLING A ROTARY ELECTRIC MACHINE AND A SYSTEM THEREOF

FIELD OF THE INVENTION

The present invention relates to controlling of rotary electric machines.

BACKGROUND OF THE INVENTION

Conventional electric motoring systems typically comprise a motor controller coupled to an electric motor, the electric motor comprising a rotor and a stator, the stator further comprising N phases with each phase comprising a winding made of set of coils connected in a series-parallel configuration. The motor controller enables optimal torque production and efficient performance of the electric motoring system by applying optimal commutation to the stator phase windings. For the purpose of maximizing the system performance and operating the system at its maximum efficiency, motor controllers require information of the relative position of rotor with respect with the stator. Accordingly, electric motors are typically coupled with a position sensor, such as a set of hall effect sensors or optical encoders. The position sensor is typically coupled with the motor controller using a wiring harness.

Position sensors such as those mentioned above add to cost of the system. Furthermore, the position sensors and the related wiring harness are prone to failure because of exposure to high temperature, vibrations and proximity to mechanical objects (typically part of rotor) moving at high speeds. Furthermore, the placement of position sensors in the mechanical package of the electric motor occupies space, hence resulting sub-optimal mechanical packaging of the electric motor.

Attempts have been made to reduce system cost and improve system robustness, by controlling electric motors without using position sensors. An existing sensor-less control method involves sensing, or estimating, back-emf voltage induced in the stator windings because of relative motion between rotor and stator. However, this method is effective only when the rotor is rotating at a relatively high speed. Another method of sensor-less control of electric motor involves injecting high frequency voltage in the stator windings to determine position of rotor by leveraging rotor saliency. However, this method results in sub-optimal machine efficiency because of unwanted harmonics in stator winding current, further resulting in unnecessary vibration and noise in the machine.

Thus, there is a need in the art for a method and system for controlling a rotary electric machine thereof which addresses at least the aforementioned problems.

SUMMARY OF THE INVENTION

In one aspect of the invention, the present invention is directed at a method for controlling a rotary electric machine. The method has the step of determining a state of the rotary electric machine based on speed of a rotor of the rotary electric machine. The state comprises a high-speed state when the rotor speed is more than a predetermined threshold speed and a low-speed state when speed of the rotor is less than the predetermined threshold speed. If the rotary electric machine is in the low-speed state, an intra-PWM current ripple and a mean current vector is calculated by measuring current in stator phase windings of the rotary electric machine within a Pulse Width Modulation Cycle. An inductance vector is computed based on the intra-PWM current ripple. A first rotor position (P1) and a first rotor speed (S1) are estimated based on the inductance vector and the mean current vector. If the rotary electric machine is in the high speed state, current in stator phase windings of the rotary electric machine is measured within a Pulse Width Modulation Cycle. Average current is determined for each stator phase winding of the rotary electric machine within the Pulse Width Modulation cycle. A second rotor position (P2) and second rotor speed (S2) is estimated based on the average currents in stator phase windings within the Pulse Width Modulation cycle. The state of the rotary electric machine is selected between the high-speed state and the low-speed state based on the estimated first rotor speed (S1) and/or the estimated second rotor speed (S2). If the low-speed state is selected, Pulse Width Modulation signals are updated based on the estimated first rotor position (P1). If the high-speed state is selected, Pulse Width Modulation signals are updated based on the estimated second rotor position (P2).

In an embodiment of the invention, the state of the rotary electric machine is initialised as the low-speed state, an initial position (P1) of the rotor of the rotary electric machine is determined with respect to a stator of the rotary electric machine by applying a set of commutations to stator phase windings and determining value of DC side current corresponding to each commutation, and initiating rotor position based on commutation resulting in maximum current. Pulse Width Modulation signals are applied to stator phase windings based on the initial position (Pi) of the rotor; after which, the state of the rotary electric machine is determined as the low-speed state.

In a further embodiment of the invention, if the rotary electric machine is determined to be in the low-speed state, the current in stator phase windings is measured for all phases of the rotary electric machine by measuring at least two samples of at least N-1 stator phase windings, out of a total of N stator phase windings. In an embodiment, whether current sampling for stator phase windings corresponding to all N phases was performed is checked. In an embodiment, multiple current samples for the Nth phase within the Pulse Width Modulation cycle are reconstructed, if the current sampling for stator phase windings corresponding to all N phases was not performed.

In a further embodiment of the invention, if the rotary electric machine is determined to be in the high-speed state, the current is measured in stator phase windings for all phases of the rotary electric machine by measuring at least one sample of at least N-1 stator phase windings, out of a total of N stator phase windings. In an embodiment, whether current sampling for stator phase windings corresponding to all N phases was performed is checked. In an embodiment, multiple current samples for the Nth phase within the Pulse Width Modulation cycle are reconstructed, if the current sampling for stator phase windings corresponding to all N phases was not performed.

In a further embodiment of the invention, average current flowing in the stator phase windings is estimated based on an assumed rotor position, DC bus voltage and on the PWM signals applied to the machine, and the estimated average current to the determined average current are compared. In an embodiment, estimation of the second rotor position (P2) and the second rotor speed (S2) is corrected by an error metric based on difference between estimated average current and the determined average current.

In another aspect, the present invention is directed at a system for controlling a rotary electric machine. The system has a pulse width modulator for applying Pulse Width Modulation signals to stator phase windings of the rotary electric machine; a plurality of semi-conductor power switches for receiving Pulse Width Modulation signals and converting the signals into AC voltage for stator phase windings of the rotary electric machine; a plurality of current sensing devices for sensing the current in the stator phase windings corresponding to phases of the rotary electric machine; and a control unit. The control unit is configured for determining a state of the rotary electric machine based on speed of a rotor of the rotary electric machine between a high-speed state when the rotor speed is more than a predetermined threshold speed and a low-speed state when speed of the rotor is less than the predetermined threshold speed. If the rotary electric machine is in the low-speed state, the control unit is configured for calculating an intra-PWM current ripple and a mean current vector by measuring current in stator phase windings of the rotary electric machine within a Pulse Width Modulation Cycle, computing an inductance vector based on the intra-PWM current ripple, estimating a first rotor position (P1) and a first rotor speed (S1) based on the inductance vector and the mean current vector. If the rotary electric machine is in the high speed state, the control unit is configured for measuring current in stator phase windings of the rotary electric machine within a Pulse Width Modulation Cycle. The control unit is further configured for determining average current for each stator phase winding of the rotary electric machine within the Pulse Width Modulation cycle, estimating a second rotor position (P2) and second rotor speed (S2) based on average current in stator phase windings within the Pulse Width Modulation cycle, selecting the state of the rotary electric machine between the high-speed state and the low-speed state based on the estimated first rotor speed (S1) and/or the estimated second rotor speed (S2). If the low-speed state is selected, the control unit is configured for updating Pulse Width Modulation signals based on the estimated first rotor position (P1), and if the high-speed state is selected, the control unit is configured for updating Pulse Width Modulation signals based on the estimated second rotor position (P2).

In an embodiment of the invention, the control unit is further configured for initializing the state of the rotary electric machine as the low-speed state, determining an initial position (Pi) of the rotor of the rotary electric machine with respect to a stator of the rotary electric machine by applying a set of commutations to stator phase windings and determining value of DC side current corresponding to each commutation and initiating rotor position based on commutation resulting in maximum current, applying Pulse Width Modulation signals to stator phase windings based on the initial position (Pi) of the rotor; after which, the state of the rotary electric machine is set as the low-speed state.

In a further embodiment of the invention, the plurality of power switches comprises a three-phase H-bridge having six semi-conductor power switches arranged in three H-bridge arms, such that each arm has a high power semiconductor switch and a low power semiconductor switch. In an embodiment, the system is configured to use space-vector-modulation technique for generating pulse-width-modulated signals based on center-aligned PWM.

In a further embodiment of the invention, the system has a current monitor is configured to: during the high speed state, measure one current sample per phase per Pulse Width Modulation cycle, the current sampling performed substantially in the center of zero-sequence commutation; and during low speed state, measure two current samples per phase per Pulse Width Modulation cycle, the current sampling performed substantially equally apart from the center of the zero-sequence commutation.

In a further embodiment of the invention, the system has at least two current sensing devices wherein each current sensing device measures current flowing through the low power semiconductor switch of each H-Bridge arm. In an alternative embodiment, the system has at least two current sensing devices wherein each current sensing device is connected in series with stator phase windings.

In another embodiment of the invention, the current monitor has analog measurement bandwidth substantially more than 10 times the frequency of PWM signal applied to the stator phase windings.

In a further embodiment of the invention, the system is configured to vary frequency of the pulse width modulator depending on variables comprising the estimated first rotor speed (S1) and the estimated second rotor speed (S2).

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention relates to a method and system for controlling a rotary electric machine. More particularly, the present invention relates to a method and system for sensorless control of a rotary electric machine.

Figure 1:
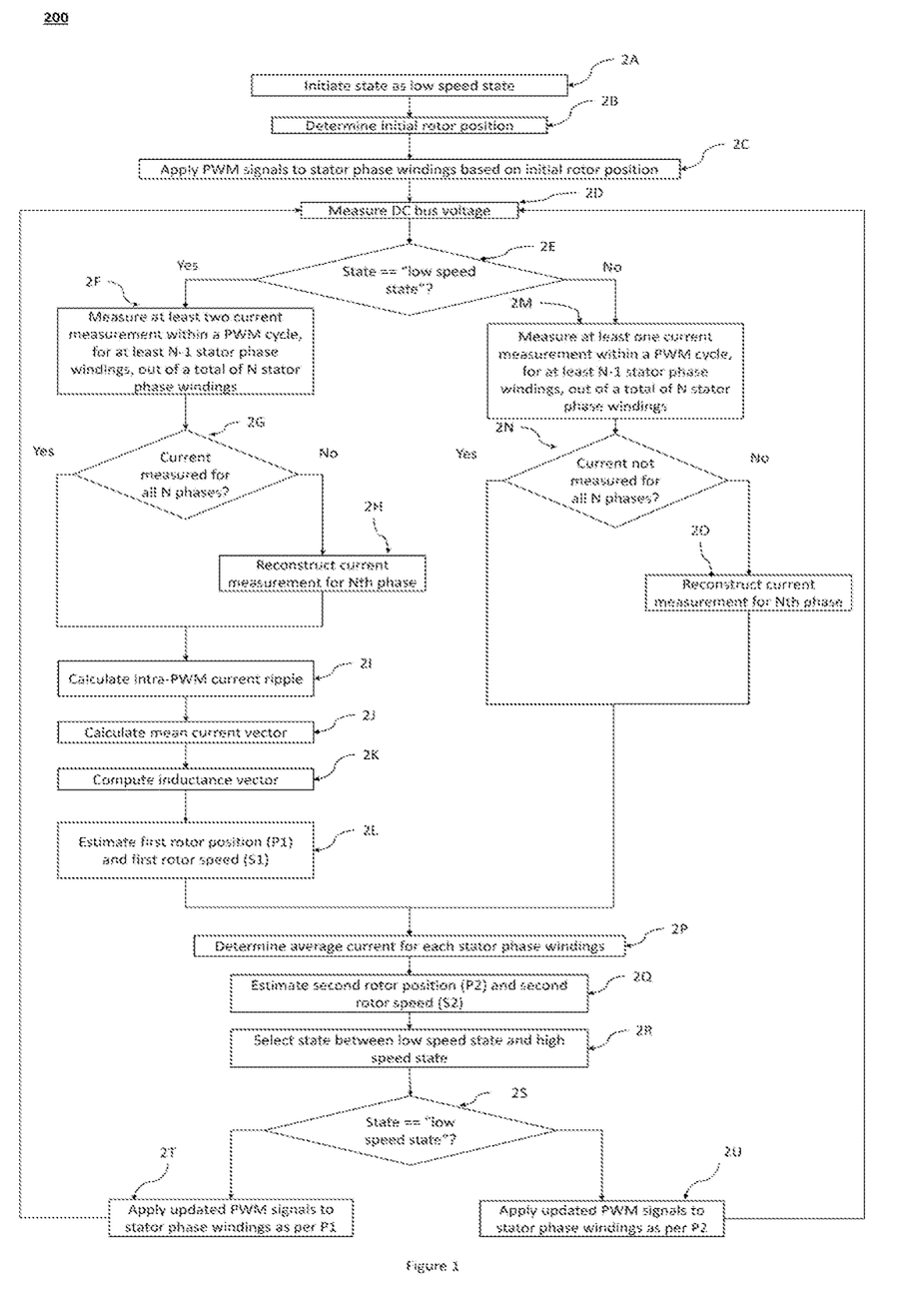
FIG. 1 illustrates a flowchart for a method of controlling a rotary electric machine in accordance with an embodiment of the invention.
Figure 2:
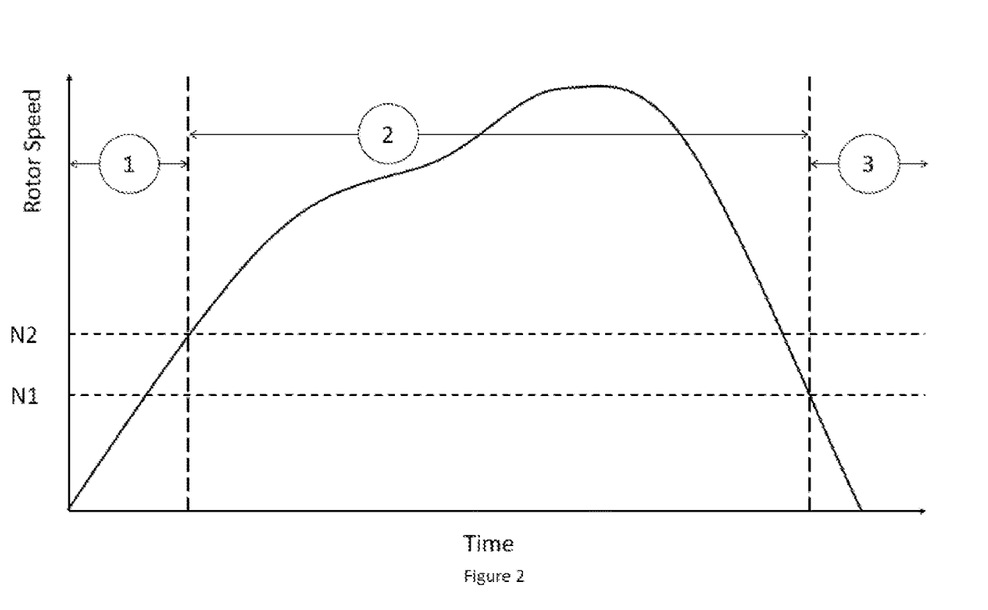
FIG. 2 illustrates an exemplary variation of speed of the rotor of the rotary electric machine under operation with time, in accordance with an embodiment of the invention.

FIG. 1 illustrates a flowchart for method steps involved in a method 200 for controlling a rotary electric machine in accordance with an embodiment of the invention. For control of the rotary electric machine, a state of the rotary electric machine is defined. In the present invention, the state of the rotary machine is defined as a low speed state when speed of a rotor of the rotary electric machine is less than a predetermined threshold speed and a high speed state when speed of the rotor is greater than the predetermined threshold speed. Reference is made to FIG. 2 which depicts variation of speed of the rotor of the rotary electric machine under operation with time, wherein, speed of the rotor is defined in three zones. As illustrated in FIG. 2, as the rotary electric machine is started from a standstill position, the state of the rotary electric machine is defined as the low speed state till the rotor speed remains less than a first predetermined threshold speed (N2). Thereafter, as the rotor speed exceeds the first predetermined threshold (N2), the state of the rotary electric machine is defined as the high speed state, for as long as the rotor speed remains greater than a second predetermined threshold speed (N1). As the rotor speed drops below the second predetermined threshold speed (N1), the state of the rotary electric machine is again defined as the low speed state.

As illustrated in FIG. 1, at step 2A, a control unit initialises the state of the rotary electric machine as the low-speed state as control of the rotary electric machine is begun from the standstill position. At step 2B, the control unit determines an initial position ($P_i$) of the rotor of the rotary electric machine with respect to a stator of the rotary electric machine. This is done by applying a set of commutations to stator phase windings and determining value of DC side current corresponding to each commutation, and initiating rotor position based on commutation resulting in maximum current. At step 2C, Pulse Width Modulation signals are applied to stator phase windings based on the initial position ($P_i$) of the rotor, thereby initializing the control of the rotary electric machine. The method 200 further comprises step 2D, of measuring DC bus voltage.

At step 2E, the state of the rotary electric machine is determined based on speed of a rotor of the rotary electric machine between a high speed state and a low speed state as explained hereinbefore. When the control of the rotary electric machine is initialized as in steps 2A-2D, the state of the rotary electric machine is determined as the low speed state at first instance. Thereafter, the state of the rotary electric machine is defined based on speed of the rotor. Separate method steps are involved in control of the rotary electric machine when the state of the rotary electric machine is determined as the low speed state from the method steps involved in control of the rotary electric machine when the state of the rotary electric machine is determined as the high speed state.

Figure 8:
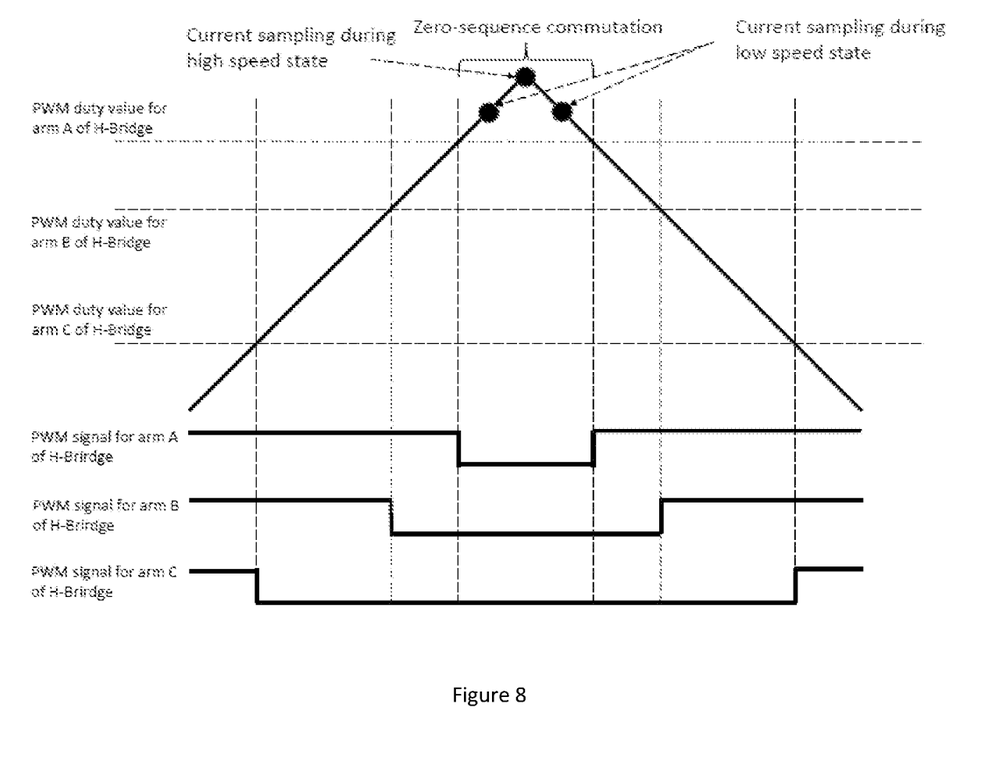
FIG. 8 illustrates PWM signal generation using space vector modulation technique based on center-aligned PWM, and a current sampling scheme in zero-sequence commutation, in accordance with an embodiment of the invention.

If the state of the rotary is determined to be in the low speed state, the method 200 moves to step 2F, otherwise the method 200 moves to step 2M. At step 2F, current in stator phase windings for all phases of the rotary electric machine is measured. This is done by measuring at least two samples of at least N-1 stator phase windings, out of a total of N stator phase windings. At step 2G, whether current sampling for stator phase windings corresponding to all N phases was performed is checked. If the current sampling for stator phase windings corresponding to all N phases was performed, the method 200 moves to step 2I, otherwise the method 200 moves to step 2H, wherein since the current sampling for stator phase windings corresponding to all N phases was not performed, multiple current samples for the Nth phase within the Pulse Width Modulation cycle are reconstructed. This reconstruction is achieved by leveraging the fact that summation of currents flowing through all phase windings, at a single time instant, is zero. Reference is made to FIG. 8 which illustrates an exemplary current sampling scheme for reconstruction of current for the Nth phase as mentioned hereinbefore. In that, the current sampling scheme illustrated in FIG. 8 relates to a three-phase electric motor wherein measurements for two current samples per phase per PWM cycle are conducted within the zero commutation as part of space vector modulation, such that the two current samples for each phase are roughly equidistant from the center of the zero commutation. This completes the current sampling for stator phase windings corresponding to all N phases of the rotary electric machine.

Figure 3:
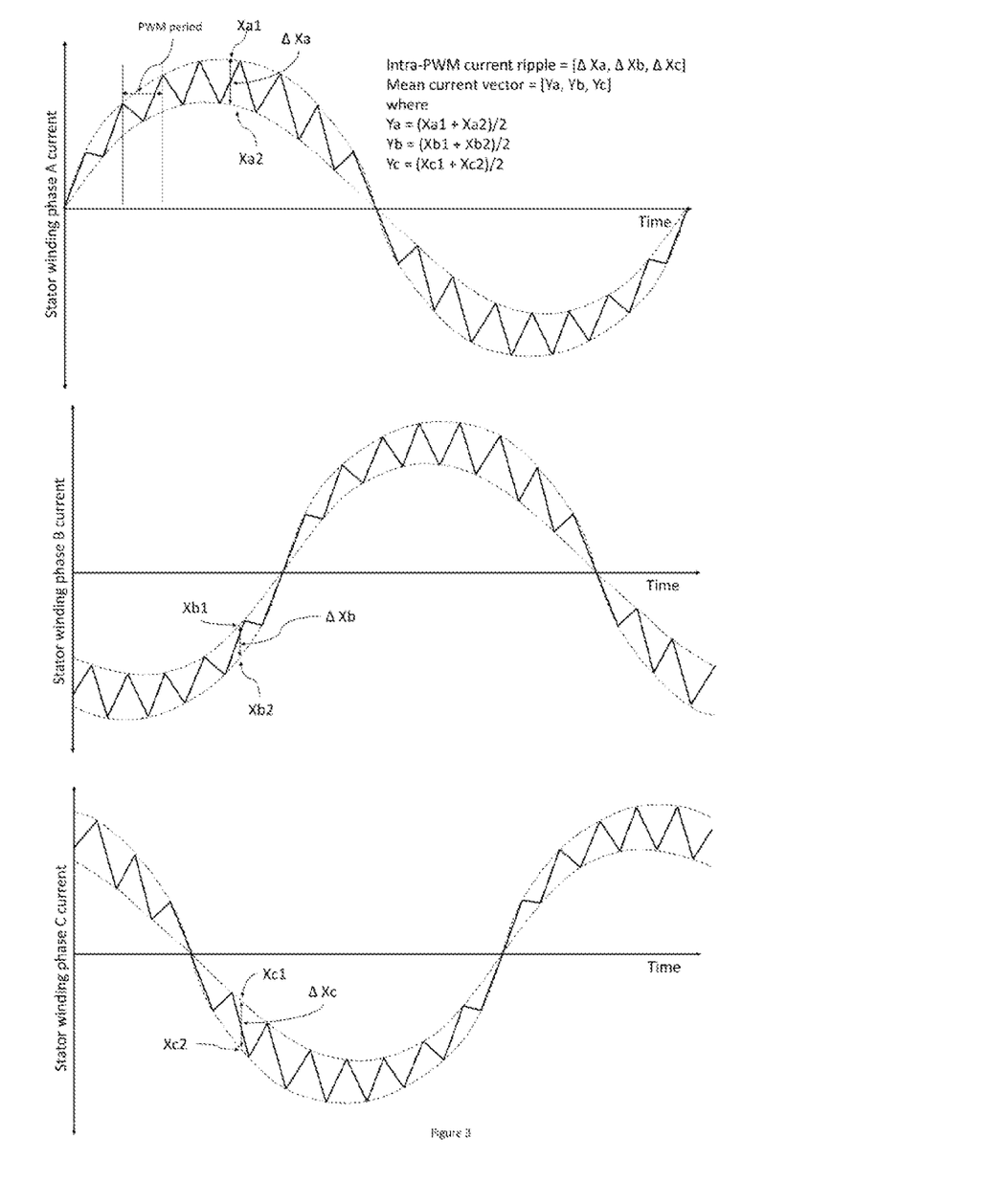
FIG. 3 illustrates an intra-PWM current ripple based on three current variation quantities, in accordance with an embodiment of the invention.
Figure 4:
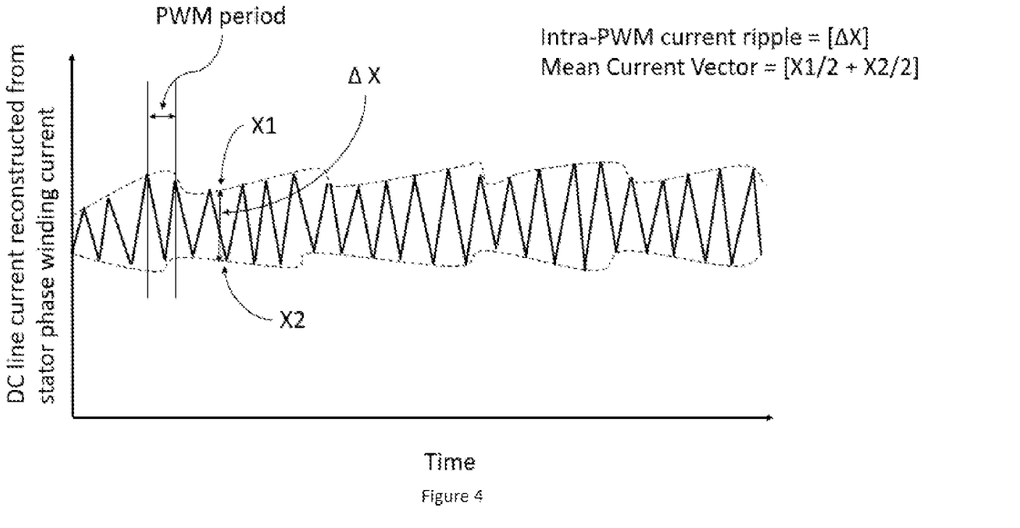
FIG. 4 illustrates intra-PWM current ripple based on a reconstruction of DC bus-side current variation constructed using individual current variation in each stator winding phase, in accordance with an embodiment of the invention.

At step 2I as mentioned above, an intra-PWM current ripple ($\Delta X$) is calculated by measuring current in stator phase windings of the rotary electric machine within a Pulse Width Modulation Cycle. The intra-PWM current ripple ($\Delta X$) is defined as change or variation in current in the stator phase winding within a Pulse Width Modulation Cycle. Such change or variation in current with the PWM cycle relates to inductance of stator winding which is an indicator of position of the rotor in the rotary electric machine. FIG. 3 illustrates the change or variation in current with respect to all three-phases of the exemplary rotary electric machine. As can be seen in FIG. 3, the intra-PWM current ripple ($\Delta X$) is made up of three individual current variation quantities ($\Delta X_a$, $\Delta X_b$, $\Delta X_c$) corresponding to three phases of the rotary electric machine. FIG. 3 depicts calculation of the intra-PWM current ripple ($\Delta X$) by reconstructing DC side current using current samples of individual stator phase windings and determining a current variation quantity for the reconstructed DC side current. FIG. 4 illustrates another embodiment of the present invention, wherein the intra-PWM current ripple ($\Delta X$) is made up of a single current variation quantity.

Further, at step 2J, a mean current vector (Y) is calculated by measuring current in stator phase windings of the rotary electric machine within a Pulse Width Modulation Cycle. The mean current vector (Y) is indicative of the magnitude of current in stator phase windings. In the embodiment depicted in FIG. 3, the mean current vector (Y) is composed of average current within PWM cycle for the three phases ($Y_a$, $Y_b$, $Y_c$). In the embodiment depicted in FIG. 4, the mean current vector (y) is composed of the average current within PWM cycle for the reconstructed DC side current waveform.

At step 2K, an inductance vector is computed based on the intra-PWM current ripple ($\Delta X$). For a stator phase winding with low ratio of inductance and resistance, the values contained in the intra-PWM current ripple ($\Delta X$) are typically large. Similarly, for a stator phase winding with a high ratio of inductance and resistance, the values contained in the intra-PWM current ripple ($\Delta X$) are typically small. The inductance vector is indicative of position of the rotor of the rotary electric machine. This is because inductance of stator phase windings varies with varying position of the rotor owing to either saliency effect in salient machines or magnetic saturation in non-salient machines or a combination thereof. In conclusion, rotor position can be inferred from the inductance vector.

At step 2L, a first rotor position (P1) and a first rotor speed (S1) are estimated based on the inductance vector and the mean current vector (Y). The rotor position and rotor speed are inferred based on the inductance vector and the mean current vector (Y) is used to compensate the effect of the magnetic saturation caused by current flowing in stator phase windings. The method 200 then moves on to step 2P.

As mentioned hereinbefore, if the state of the rotary electric machine is not determined as the low speed state, that is, the state of the rotary electric machine is determined as the high-speed state, the method 200 moves to step 2M from step 2E. At step 2M, current in stator phase windings of the rotary electric machine is measured within the Pulse Width Modulation Cycle. This is done by measuring of the current in stator phase windings for all phases of the rotary electric machine by measuring at least one sample of at least N-1 stator phase windings, out of a total of N stator phase windings. At step 2N, whether current sampling for stator phase windings corresponding to all N phases was performed is checked. If the current sampling for stator phase windings corresponding to all N phases was performed, the method 200 moves to step 2P, otherwise the method 200 moves to step 2O, wherein since the current sampling for stator phase windings corresponding to all N phases was not performed, multiple current samples for the Nth phase within the Pulse Width Modulation cycle are reconstructed in accordance with the same principle as explained above that summation of currents flowing through all phase windings, at a single time instant, is zero. The method 200 then moves to step 2P.

Figure 5:
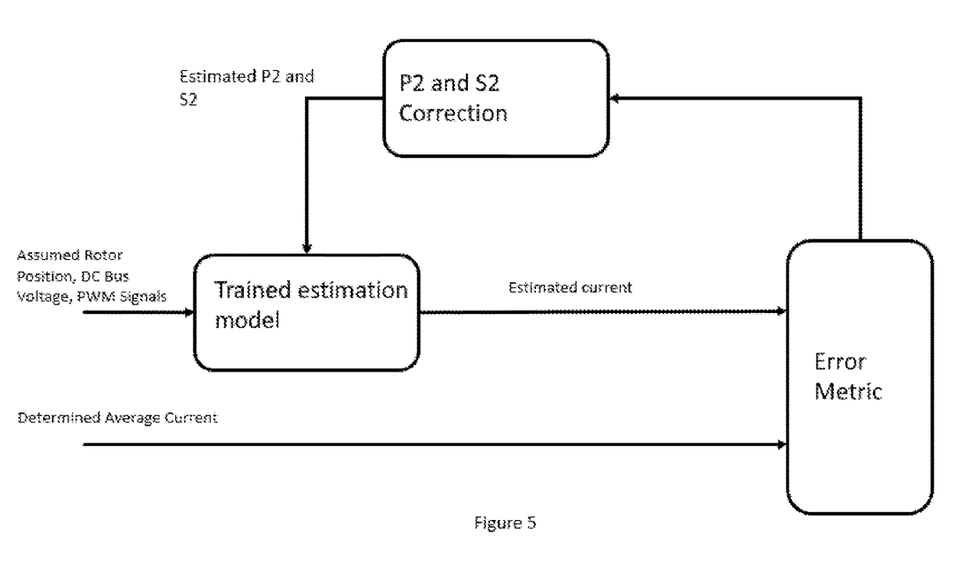
FIG. 5 illustrates a flowchart of a trained estimation model for estimating rotor position and rotor speed in accordance with an embodiment of the invention.

At step 2P, average current for each stator phase winding of the rotary electric machine is determined within the Pulse Width Modulation cycle. At step 2Q, a second rotor position (P2) and second rotor speed (S2) is estimated based on the average currents in stator phase windings within the Pulse Width Modulation cycle. In an embodiment of the invention as depicted in the flowchart of FIG. 5, the estimation of the second rotor position (P2) and the second rotor speed (S2) is done by means of a trained estimation model of the rotary electric machine comprising knowledge of inductance and resistance of the stator winding. The dynamic estimation model is used to estimate the current flowing in stator phase windings based on an assumed rotor position, DC bus voltage as measured in step 2D and on the PWM signals applied to the machine. The estimated current so measured is then compared to the determined average current at step 2P. The difference between the estimated current and the determined average current is termed as error metric and the error metric is used to further correct the estimate of the second rotor position and the second rotor speed such that the value of the error metric is kept close to zero.

At step 2R, the state of the rotary electric machine is selected between the high-speed state and the low-speed state based on the estimated first rotor speed (S1) and/or the estimated second rotor speed (S2) in accordance with the embodiment described in FIG. 2. In an embodiment the state of the rotary electric machine is based on a combination of the estimated first rotor speed (S1) and the estimated second rotor speed (S2). In an embodiment of the invention, the state of the rotary machine so selected at step 2R is fed as the determined state of the rotary electric machine at step 2E, that is the state of the rotary electric machine selected at step 2R acts as the determined state of the rotary electric machine at step 2E.

At step 2S, the control unit checks the state selected at step 2R. If the state of the rotary electric machine is selected at low speed state, the method 200 moves to step 2T wherein Pulse Width Modulation signals applied to stator phase windings are updated based on the estimated first rotor position (P1). Conversely, if the state of the rotary electric machine is selected at the high speed state, the method 200 moves to step 2U wherein Pulse Width Modulation signals applies to stator phase windings are updated based on the estimated second rotor position (P2).

Figure 6:
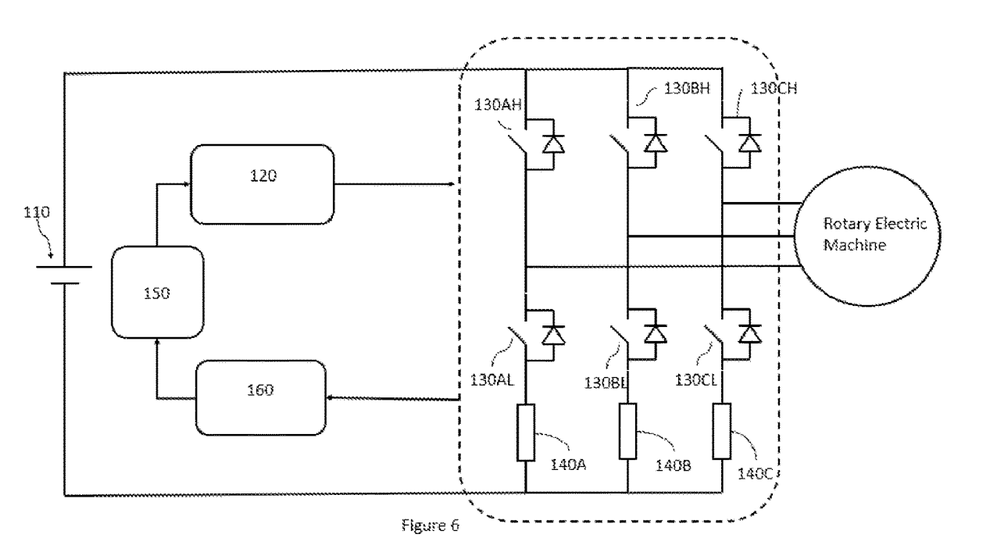
FIG. 6 illustrates a system for controlling the rotary electric machine in accordance with an embodiment of the invention.

In another aspect, the present invention relates to a system 100 for controlling the rotary electric machine. FIG. 6 illustrates the system 100 for controlling the rotary electric machine, in accordance with an embodiment of the invention. In an embodiment, the system 100 is coupled to a direct voltage current source 110 such as a battery which powers the system 100 and the rotary electric machine. As illustrated in FIG. 6, the system 100 comprises a pulse width modulator 120 for applying Pulse Width Modulation signals to stator phase windings of the rotary electric machine, a plurality of semi-conductor power switches 130 for receiving Pulse Width Modulation signals and converting the signals into AC voltage for stator phase windings of the rotary electric machine, a plurality of current sensing devices 140 for sensing the current in the stator phase windings corresponding to phases of the rotary electric machine and a control unit 150 configured for performing the method steps 2A-2U as described hereinbefore.

In an embodiment of the invention, the plurality of semi-conductor power switches 130 comprises a three-phase H-bridge having six semi-conductor power switches 130AH, 130BH, 130CH, 130AL, 130BL, 130CL arranged in three H-bridge arms, such that each arm has a high power semiconductor switch and a low power semiconductor switch. Resultantly the three-phase H-bridge has a total of three high power semiconductor switches 130AH, 130BH, 130CH and three low power semiconductor switches 130AL, 130BL, 130CL. In an embodiment the plurality of power switches 130 comprises metal-oxide-semiconductor field-effect transistors (MOSFETs) of insulated-gate bipolar transistors (IGBTs). In an embodiment of the invention, the system 100 is configured to use space-vector-modulation technique for generating pulse-width-modulated signals based on center-aligned Pulse Width Modulation as illustrated in FIG. 8.

Figure 7:
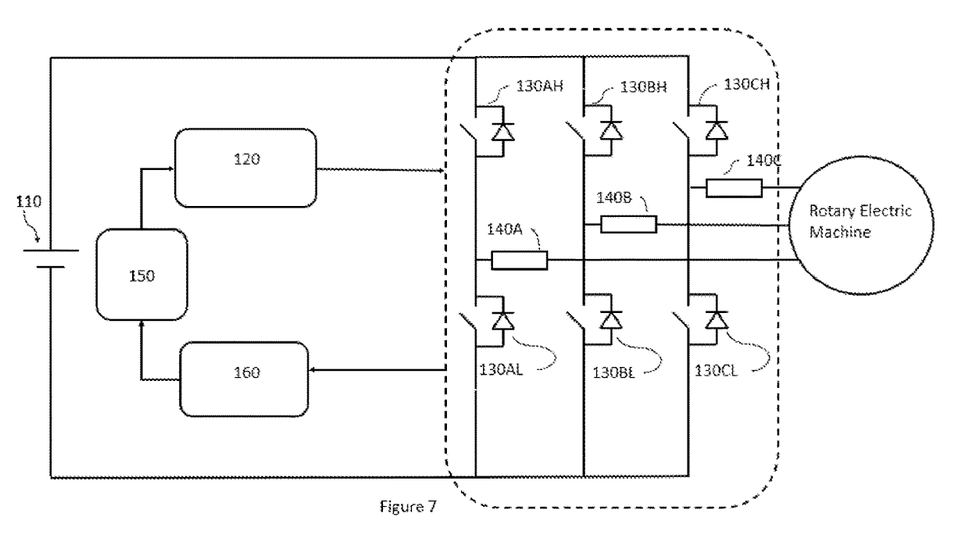
FIG. 7 illustrates a system for controlling the rotary electric machine in accordance with an embodiment of the invention.

In a further embodiment of the invention, the plurality of current sensing devices 140 comprises at least two current sensing devices wherein each current sensing device measures current flowing through the low power semiconductor switch 130AL, 130BL, 130CL of each H-Bridge arm. The embodiment illustrated in FIG. 6 depicts three current sensing 140A, 140B, 140C devices wherein each current sensing device measures current flowing through the lower power semiconductor switch 130AL, 130BL, 130CL of each H-bridge arm. In an alternate embodiment of the invention as illustrated in FIG. 7, the plurality of current sensing devices 140 comprises at least two current sensing devices wherein each current sensing device is connected in series with stator phase windings. In an embodiment, the plurality of current sensing devices 140 comprises three current sensing devices 140A, 140B, 140C wherein each current sensing device is connected in series with three stator phase windings corresponding to an exemplary three phase rotary electric machine.

As illustrated in FIG. 6, the system 100 further comprises of a current monitor 160 that is configured to measure one current sample per phase per Pulse Width Modulation cycle wherein the current sampling is performed substantially in the center of zero-sequence commutation, when the state of the rotary electric machine is the high-speed state. The current monitor 160 is further configured to measure two current samples per phase per Pulse Width Modulation cycle wherein the current sampling performed substantially equally apart from the center of the zero-sequence commutation, when the state of the rotary electric machine is the low speed state.

To accurately detect current variation or change within the Pulse Width Modulation cycle, the current sensing devices 140 are preferred to have sufficiently large analog measurement bandwidth, preferably in excess of 10 times of frequency of the PWM signal applied to stator phase windings.

In operation, the system 100 via the pulse width modulator 120 is configured to generate different frequency of PWM signals along for stator phase windings at different speeds of the rotor of the rotary electric machine and PWM duty values for different arms of the three-phase H bridge as illustrated in FIG. 8. PWM duty value is defined by proportion of 1 s to 0 s received from the pulse width modulator. Lower frequency of PWM signals during the low speed state allows a more accurate measurement of current change or variation as low PWM frequency allows a provision for increasing time duration between the first and last current sample within the PWM cycle. Higher PWM frequency during the high speed state allows a greater number of current samples per unit motion of rotor, and a correspondingly greater update rate of PWM signals to stator phase windings, hence resulting in better control bandwidth.

Advantageously, the present invention provides a method and system for controlling a rotary electric machine whereby a sensor-less control of the rotary electric machine is provided, hence negating the requirement of sensors such as hall sensors in the motors. This allows for optimal mechanical packaging of the electric motor.

Further, the method of the present invention provides for sensor-less control of the rotary electric machine at all speeds of operation of the rotary electric machine, especially low speed without increasing unwanted harmonic current in stator phase windings.

While the present invention has been described with respect to certain embodiments, it will be apparent to those skilled in the art that various changes and modification may be made without departing from the scope of the invention as defined in the following claims.

The invention claimed is:

1. A method (200) for controlling a rotary electric machine, comprising the steps of:
   determining a state of the rotary electric machine based on speed of a rotor of the rotary electric machine, the state comprising a high-speed state when the rotor speed is more than a predetermined threshold speed and a low-speed state when speed of the rotor is less than the predetermined threshold speed;
   if the rotary electric machine is in the low-speed state:
   calculating an intra-PWM current ripple ($\Delta X$) and a mean current vector (Y) by measuring current in stator phase windings of the rotary electric machine within a Pulse Width Modulation Cycle;
   computing an inductance vector based on the intra-PWM current ripple ($\Delta X$);
   estimating a first rotor position (P1) and a first rotor speed (S1) based on the inductance vector and the mean current vector (Y);
   if the rotary electric machine is in the high speed state:
   measuring current in stator phase windings of the rotary electric machine within a Pulse Width Modulation Cycle;
   determining average current for each stator phase winding of the rotary electric machine within the Pulse Width Modulation cycle;
   estimating a second rotor position (P2) and second rotor speed (S2) based on the average currents in stator phase windings within the Pulse Width Modulation cycle;
   selecting the state of the rotary electric machine between the high-speed state and the low-speed state based on the estimated first rotor speed (S1) and/or the estimated second rotor speed (S2);
   if the low-speed state is selected, updating Pulse Width Modulation signals based on the estimated first rotor position (P1); and
   if the high-speed state is selected, updating Pulse Width Modulation signals based on the estimated second rotor position (P2).

2. The method (200) as claimed in claim 1, further comprising the steps of:
   initialising the state of the rotary electric machine as the low-speed state;
   determining an initial position ($P_i$) of the rotor of the rotary electric machine with respect to a stator of the rotary electric machine by applying a set of commutations to stator phase windings and determining value of DC side current corresponding to each commutation, and initiating rotor position based on commutation resulting in maximum current;
   applying Pulse Width Modulation signals to stator phase windings based on the initial position ($P_i$) of the rotor; after which, the state of the rotary electric machine is determined as the low-speed state.

3. The method (200) as claimed in claim 1, wherein if the rotary electric machine is determined to be in the low-speed state, measuring of the current in stator phase windings for all phases of the rotary electric machine is done by measuring at least two samples of at least N-1 stator phase windings, out of a total of N stator phase windings.

4. The method (200) as claimed in claim 3, further comprising the step of checking whether current sampling for stator phase windings corresponding to all N phases was performed.

5. The method (200) as claimed in claim 4, further comprising the step of reconstructing multiple current samples for the Nth phase within the Pulse Width Modulation cycle, if the current sampling for stator phase windings corresponding to all N phases was not performed.

6. The method (200) as claimed in claim 1, wherein if the rotary electric machine is determined to be in the high-speed state, measuring of the current in stator phase windings for all phases of the rotary electric machine is done by measuring at least one sample of at least N-1 stator phase windings, out of a total of N stator phase windings.

7. The method (200) as claimed in claim 6, further comprising the step of checking whether current sampling for stator phase windings corresponding to all N phases was performed.

8. The method (200) as claimed in claim 7, further comprising the step of reconstructing multiple current samples for the Nth phase within the Pulse Width Modulation cycle, if the current sampling for stator phase windings corresponding to all N phases was not performed.

9. The method (200) as claimed in claim 1, further comprising the step of estimating average current flowing in the stator phase windings based on an assumed rotor position, DC bus voltage and on the PWM signals applied to the machine, and comparing the estimated average current to the determined average current.

10. The method (200) as claimed in claim 9, wherein the estimation of the second rotor position (P2) and the second rotor speed (S2) is corrected by an error metric based on difference between estimated average current and the determined average current.

11. A system (100) for controlling a rotary electric machine, comprising:
- a pulse width modulator (120) for applying Pulse Width Modulation signals to stator phase windings of the rotary electric machine;
- a plurality of semi-conductor power switches (130) for receiving Pulse Width Modulation signals and converting the signals into AC voltage for stator phase windings of the rotary electric machine;
- a plurality of current sensing devices (140) for sensing the current in the stator phase windings corresponding to phases of the rotary electric machine; and
- a control unit (150) configured for determining a state of the rotary electric machine based on speed of a rotor of the rotary electric machine between a high-speed state when the rotor speed is more than a predetermined threshold speed and a low-speed state when speed of the rotor is less than the predetermined threshold speed, if the rotary electric machine is in the low-speed state: calculating an intra-PWM current ripple ($\Delta X$) and a mean current vector (Y) by measuring current in stator phase windings of the rotary electric machine within a Pulse Width Modulation Cycle, computing an inductance vector based on the intra-PWM current ripple ($\Delta X$), estimating a first rotor position (P1) and a first rotor speed (S1) based on the inductance vector and the mean current vector (Y), if the rotary electric machine is in the high speed state: measuring current in stator phase windings of the rotary electric machine within a Pulse Width Modulation Cycle, determining average current for each stator phase winding of the rotary electric machine within the Pulse Width Modulation cycle, estimating a second rotor position (P2) and second rotor speed (S2) based on average current in stator phase windings within the Pulse Width Modulation cycle, selecting the state of the rotary electric machine between the high-speed state and the low-speed state based on the estimated first rotor speed (S1) and/or the estimated second rotor speed (S2), if the low-speed state is selected: updating Pulse Width Modulation signals based on the estimated first rotor position (P1), and if the high-speed state is selected: updating Pulse Width Modulation signals based on the estimated second rotor position (P2).

12. The system (100) as claimed in claim 11, wherein the control unit (150) is further configured for initialising the state of the rotary electric machine as the low-speed state, determining an initial position (Pi) of the rotor of the rotary electric machine with respect to a stator of the rotary electric machine by applying a set of commutations to stator phase windings and determining value of DC side current corresponding to each commutation and initiating rotor position based on commutation resulting in maximum current, applying Pulse Width Modulation signals to stator phase windings based on the initial position (Pi) of the rotor; after which, the state of the rotary electric machine is set as the low-speed state.

13. The system (100) as claimed in claim 11, wherein the plurality of power switches (130) comprise a three-phase H-bridge having six semi-conductor power switches (130AH, 130BH, 130CH, 130AL, 130BL, 130CL) arranged in three H-bridge arms, such that each arm has a high power semiconductor switch and a low power semiconductor switch.

14. The system (100) as claimed in claim 13, configured to use space-vector-modulation technique for generating pulse-width-modulated signals based on center-aligned PWM.

15. The system (100) as claimed in claim 14, wherein a current monitor (160) is configured to: during the high speed state, measure one current sample per phase per Pulse Width Modulation cycle, the current sampling performed substantially in the center of zero-sequence commutation; and during low speed state, measure two current samples per phase per Pulse Width Modulation cycle, the current sampling performed substantially equally apart from the center of the zero-sequence commutation.

16. The system (100) as claimed in claim 13, comprising at least two current sensing devices (140) wherein each current sensing device measures current flowing through the low power semiconductor switch (130AL, 130BL, 130CL) of each H-Bridge arm.

17. The system (100) as claimed in claim 13, comprising at least two current sensing devices (140) wherein each current sensing device is connected in series with stator phase windings.

18. The system (100) as claimed in claim 15, wherein the current monitor (160) has analog measurement bandwidth substantially more than 10 times the frequency of PWM signal applied to the stator phase windings.

19. The system (100) as claimed in claim 11, configured to vary frequency of the pulse width modulator (120) depending on variables comprising the estimated first rotor speed (S1) and the estimated second rotor speed (S2).

* * * * *